Figure 2:
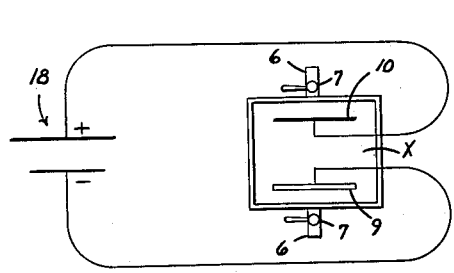

March 17, 1953

J. W. CONWELL 2,631,974

SULFURIC ACID RECOVERY PROCESS

Filed Jan. 6, 1950

INVENTOR.
JOHN W. CONWELL

BY
Thomas R. O'Malley
ATTORNEY.

UNITED STATES PATENT OFFICE 2,631,974

SULFURIC ACID RECOVERY PROCESS

John W. Conwell, St. Albans, W. Va., assignor to American Viscose Corporation, Wilmington, Del., a corporation of Delaware Application January 6, 1950, Serial No. 137,161

9 Claims. (Cl. 204—104)

This invention relates to an electrolytic system for the recovery of certain ingredients from the waste liquors discharged from various chemical processes. It is particularly concerned with the recovery of sulfate ions in acid aqueous solutions containing them by the conversion thereof into aqueous sulfuric acid solutions of sufficient purity to be of commercial value. It is also concerned with the recovery of certain metals in the form of precipitatable compounds thereof.

The object of this invention is to provide effective and economical means of recovering sulfuric acid from dilute solutions of the same or from those of acid sulfates such as $NaHSO_4$ as are frequently found in the effluent of certain chemical plants. A secondary object is to recover certain metals, such as zinc, from such dilute solutions.

This invention consists essentially of exposing the dilute acid sulfate solution to electrodes of $PbO_2$ and $Pb$ respectively, which are connected electrically with an external source of direct current so that current flows through the system in the same direction relative to the electrodes as that of the lead-acid type of storage cell during normal discharge. During the passage of current, a spontaneous fixation of the sulfate ions takes place on both electrodes with the formation of $PbSO_4$. Some current is generated during this formation and it supplements that produced by the external source. Its recovery or consumption for heating or electromotive purposes is incidental to the main purpose of this invention.

The rate of sulfate fixation is a function of sulfate ion and hydrogen ion concentration, decreasing with lower concentrations in accordance with well-known principles of electrochemistry. It is also a function of the current passing through the system. Because of this latter relationship, it is possible to obtain increased rate of fixation, to remove a larger proportion of the sulfate ions, and to regulate the rate of fixation in a simple manner.

After deposition of the sulfate, the spent solution is removed from contact with the electrodes and a suitable external direct current voltage is impressed in the opposite direction (i. e., in the normal direction of charging or regeneration of the lead-acid type of cell) with water or dilute aqueous sulfuric acid surrounding the electrodes. In some special situations, the aqueous acid waste may be sufficiently pure (though of low concentration) to be used as the dilute acid medium in which recovery is performed. In this stage, sulfuric acid solution is formed in accordance with the following equation:

$$2PbSO_4 + 2H_2O + 2 \text{ faradays} = PbO_2 + Pb + 2H_2SO_4$$

The electrodes may then be reused to fix additional sulfate from dilute waste liquor.

Various types of equipment for carrying out the process are possible. In one type, the electrodes remain in the same container at all times, and the liquid is changed as required to fix sulfate on the one hand and recover it as sulfuric acid on the other. In order to provide a continuous process of sulfuric acid or sulfate recovery, the cells may be arranged in the form of a ring. As shown in the attached Figure 1, the liquid effluent enters into cell 3 and will flow in series through cells 3, 4 and 5 from the last of which it is discharged. The cell containers are provided with conduits 6 having valves or cocks 7 for controlling entrance of the effluent or influent waste liquor to be treated and discharge of the effluent treated liquid. Flexible or rigid insulated conduits 8, such as of rubber, may be used to connect the cells in series. While three cells are connected in series in Figure 1, any number may be so connected, or, if desired, each cell may process separately. The lead electrode in each cell is designated 9 and the lead oxide electrode 10. The electrodes may be of commercial grade, such as conventionally used in the lead-acid storage battery. During the fixation cycle of Figure 1, the current flows through a resistance or equivalent current-consuming load 11 and through cells 3, 4 and 5 in series, the cells being connected in series with a direct current source 17 having a potential sufficient to force current through the cells, by conductors 12, 13, and 14 respectively. The waste liquor to be treated is introduced continuously or intermittently at A and is discharged at B.

Figure 2 shows a cell x in process of sulfate regeneration which is electrically connected with a direct current power source 18 of a voltage exceeding the potential of the cell or cell aggregate in the circuit with the positive side of the source 18 connected to the lead oxide electrode 10 and the negative side to the lead electrode 9. The cell potential may vary, depending on the electrolyte concentration and acidity, from a value of substantially less than 2 volts up to somewhat more than 2 volts. The voltage of the source 18 may accordingly vary widely. When a single cell is in the regenerating circuit as in Figure 2, the potential of source 18 may be from about 2 to 2.5 or 3 volts whereas if the cell aggregate being regenerated had a potential of 24 volts, an external source 18 of 26 to 28 volts would be quite practical. Before the cell is transferred from the lead sulfate fixation stage of Figure 1 to the sulfate ion regeneration stage of Figure 2, the liquid content is removed from the cell and replaced either with water or a dilute sulfuric acid solution into which the sulfuric acid is to be introduced.

Figure 1:
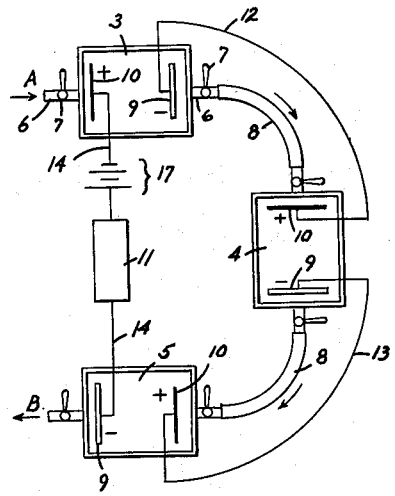

The cycle of operation is preferably as follows:

When the desired amount of sulfate has been removed from the electrodes in cell $x$ (Fig. 2), the sulfuric acid solution is removed, cell 3 is cut out of the electrical circuit of Figure 1 and drained of its contents, preferably while blanketing the exposed portions of the electrodes with a non-oxidizing atmosphere, such as of nitrogen, carbon dioxide, helium, and the like, after which the sulfuric acid solution from cell $x$ may be transferred to cell 3. The effluent or waste liquor to be treated is then introduced in cell 4 and flows in succession through cells 4, 5 and $x$, from which it is then discharged. Cell $x$ may have its terminals connected in series with cells 4 and 5 through the current-consuming load 11. The electrical circuit in Figure 2 is then connected to cause current to flow through cell 3 in normal charging direction which is opposite to that occurring during fixation in the system of Figure 1. The sulfate is thereby regenerated as sulfuric acid. This process is then continued in cyclical manner until the regenerated sulfuric acid is at the desired strength at which time it may be withdrawn for use and replaced by water or dilute acid.

Figure 3:
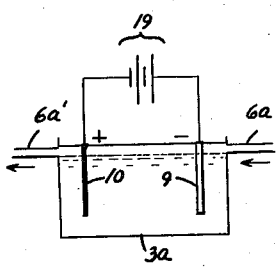

Figure 3 shows a system for sulfate fixation in accordance with the invention utilizing a single cell $3a$ in which the electrodes 9 and 10 of lead and lead oxide respectively are connected with an external source of direct current 19, the positive side of which is connected with the lead electrode 9. The electrolyte may be introduced continuously or intermittently by the connection $6a$ and discharged by the connection $6a'$.

Figure 4:
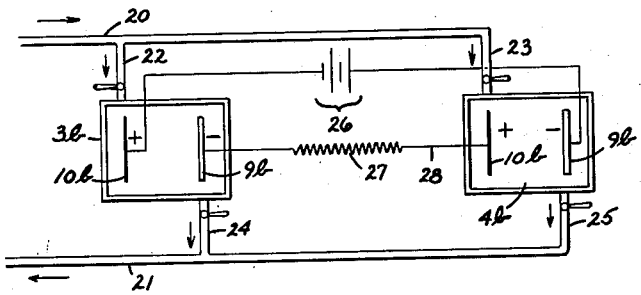

Figure 4 illustrates a modification in which the cells $3b$ and $4b$ are connected in parallel with the waste liquor supply header 20 and discharge header 21 by means of branch pipes 22, 23, 24 and 25. Any number of cells may thus be connected in parallel. The cells may be connected electrically either in parallel or in series. As shown, a direct current source 26 has its positive side connected with the lead electrode $9b$ of cell $4b$ and its negative side to the lead oxide electrode $10b$ of cell $3b$. The other two electrodes are connected with a current-consuming load 27 by means of the line 28

A plurality of cells may be connected in any suitable fashion, either in parallel or in series with one or more external sources of direct current. The number of cells that can be so connected depends upon the voltage of the external source or sources. For example, it is possible to connect any number of like cells in series with a direct current source as long as the voltage impressed upon each of the cells is sufficiently in excess of each of the cell potentials. Additional cells may be connected in parallel, if desired, and in all of such cases, the voltage must exceed the effective potential of the cell aggregate in the circuit and be sufficient to carry out the electrolytic process satisfactorily.

In a cell, such as that of Figure 3, a waste liquor containing 0.44% sulfuric acid, 1.16% sodium sulfate, and 0.04% zinc sulfate, and substantially all the rest water, was electrolyzed with an electrode area of 450 square inches in an electrolyte volume of 750 cc. During 30 minutes operation without a direct current source 19, 35% of the acid was fixed on the electrodes whereas with the direct current source 19 in circuit, 59% of the acid was removed in 30 minutes.

The electrolyte concentration after regeneration can be controlled at will. It depends upon the composition of the initial electrolyte fixed, the quantity fixed, the extent of regeneration, the initial electrolyte composition of the medium in which regeneration occurs and the amount retained upon the electrodes. In one example, in which fixation occurred in a cell having an electrode area of 450 square inches, and regeneration was initiated in distilled water, the final electrolyte contained 6.66% sulfuric acid. This was built up by three additional electrode regeneration cycles to a concentration of 17.15% sulfuric acid.

The electrodes of the present invention may have any suitable form, but it is generally preferred to have a high surface area exposure, which is characteristic of the conventional pasted type electrodes which give the porous type active electrode areas. However, any type electrode suitable for service in the Pb-acid cell will be satisfactory for this duty. The waste liquors or effluents that may be considered the raw materials for the recovery procedure may be those obtained from various chemical processing plants, such as those which produce viscose rayon, cellophane, and other synthetic filaments, from processing plants which utilize sulfuric acid coagulating media, and the like. Waste liquors containing from $\frac{1}{10}$ to 10% of sulfuric acid are amenable to recovery of sulfuric acid by such a process. Such liquors may also contain from ½ to 25% of sulfates of alkali metals, such as sodium or potassium, and they may contain up to 10% of sulfates of alkaline earth metals and of other metals in the second group of the periodic table, such as magnesium, zinc, and the like. As indicated above, a typical waste effluent from a viscose rayon plant containing about ½% of sulfuric acid, about 1% of sodium sulfate and 0.03% zinc sulfate can be satisfactorily processed in accordance with the present invention with the recovery of the sulfuric acid in a reasonably concentrated form up to 40%. During electrolysis, the waste liquor becomes less and less acid. The fixation of lead sulfate may be stopped at any pH desired but is preferably stopped before a pH of 7 is exceeded.

When a salt of one of the alkaline earth metals or zinc sulfate is present, such salt may be recovered by precipitation from the electrolyzed solution after its removal from the cell. For example, in the viscose rayon industry, the zinc salt may be recovered by treatment with sodium sulfide after neutralization if necessary. The waste sodium sulfide solution obtained from the desulfurizing stage of viscose rayon manufacture may be used for this purpose. Instead of using sodium sulfide as a precipitant, the zinc may be precipitated as $Zn(OH)_2$ by rendering the solution alkaline. The zinc hydroxide may be recovered as such by filtration and drying, or it may be converted to ZnO by heating in the conventional way. Such zinc compounds obtained after recovery by filtration or other conventional means may, under suitable conditions, have reuse, such as by the introduction in proper amounts in the viscose rayon coagulating bath.

The particular advantage of this invention is that it will permit sulfates and sulfuric acid to be recovered from extremely dilute solutions of sulfuric acid or its salts to produce concentrations of sulfuric acid which are usable in rayon, cellophane, and other chemical processes, viz., up to 40%. The use of the lead-acid process has the advantage of releasing a mol of sulfuric acid theoretically at each electrode for the passage of two faradays of current. This results in one-half the current consumption encountered in electrolytic processes which release sulfuric acid at only one electrode. The attendant use of current is of the order of magnitude of 125 ampere hours per pound of sulfuric acid at a potential of approximately 3.3 volts. Accordingly, the power consumption would be approximately 400 watt hours per pound of sulfuric acid. In addition, a certain amount of power may be recovered from the sulfate fixation cells. Insofar as excess voltages and overcharging are avoided, side reactions such as electrolysis of water may be minimized with attendant conservation of electrical energy.

It will be understood that changes and variations may be made without departing from the spirit and scope of the invention as defined in the appended claims.

I claim:

1. The process of recovering sulfate ions as a sulfuric acid solution substantially free of ions other than those of water and sulfuric acid from an acid aqueous salt solution containing 0.1 to 10% sulfuric acid and ½ to 25% of an alkali metal sulfate comprising the steps of passing a direct current from an external source thereof through the salt solution by way of a lead electrode and a lead peroxide electrode disposed therein with the lead electrode connected to the positive side of the current source and the peroxide electrode connected to the negative side thereby forming a deposit of lead sulfate on the electrodes, subsequently recovering sulfuric acid by impressing a direct current on the electrodes carrying the lead sulfate deposit with the posisive side of the direct current source connected to the lead peroxide electrode and the negative side to the lead electrode while the electrodes are part of an electrolytic cell formed by suspending them in an aqueous medium selected from the group consisting of water and water containing sulfuric acid dissolved therein as the sole solute to liberate the sulfate ions from the electrodes into said medium as a sulfuric acid solution, and continuing to liberate sulfate ions from electrodes into said medium in this fashion until the latter is converted into a sulfuric acid solution of greater concentration than that of the first-mentioned salt solution, the voltage of direct current impressed on the electrodes during the recovery stage being in excess of the potential of the recovery cell.

2. The process of recovering sulfate ions as a sulfuric acid solution substantially free of ions other than those of water and sulfuric acid from an acid aqueous salt solution containing 0.1 to 10% sulfuric acid and ½ to 25% of an alkali metal sulfate comprising the steps of passing a direct current from an external source thereof through the salt solution by way of a lead electrode and a lead peroxide electrode disposed therein with the lead electrode connected to the positive side of the current source and the peroxide electrode connected to the negative side thereby forming a deposit of lead sulfate on the electrodes, subsequently recovering sulfuric acid by impressing a direct current on the electrodes carrying the lead sulfate deposit with the positive side of the direct current source connected to the lead peroxide electrode and the negative side to the lead electrode while the electrodes are part of an electrolytic cell formed by suspending them in an aqueous medium selected from the group consisting of water and water containing sulfuric acid dissolved therein as the sole solute to liberate the sulfate ions from the electrodes into said medium as a sulfuric acid solution, and continuing to liberate sulfate ions from electrodes into said medium in this fashion until the latter is converted into a sulfuric acid solution of greater concentration than that of the first-mentioned salt solution, the voltage of direct current impressed on the electrodes during the recovery stage being at least about two volts.

3. The process of recovering sulfate ions as a sulfuric acid solution substantially free of ions other than those of water and sulfuric acid from an acid aqueous salt solution containing 0.1 to 10% sulfuric acid and ½ to 25% of an alkali metal sulfate comprising the steps of passing a direct current from an external source thereof through the salt solution by way of a lead electrode and a lead peroxide electrode disposed therein with the lead electrode connected to the positive side of the current source and the peroxide electrode connected to the negative side thereby forming a deposit of lead sulfate on the electrodes, subsequently recovering sulfuric acid by impressing a direct current on the electrodes carrying the lead sulfate deposit with the positive side of the direct current source connected to the lead peroxide electrode and the negative side to the lead electrode while the electrodes are part of an electrolytic cell formed by suspending them in an aqueous medium selected from the group consisting of water and water containing sulfuric acid dissolved therein as the sole solute to liberate the sulfate ions from the electrodes into said medium as a sulfuric acid solution, the voltage of direct current impressed on the electrodes during the recovery stage being in excess of the potential of the recovery cell.

4. A process as defined in claim 1 in which the aqueous salt solution is passed through the first-mentioned cell continuously.

5. A process as defined in claim 1 in which the aqueous salt solution is subjected in a plurality of cells to the electrolytic action of lead and lead peroxide electrodes and the solution is continuously circulated in series relationship through the plurality of cells.

6. A process as defined in claim 1 in which the acid aqueous salt solution contains ½ to 10% of sulfuric acid and the aqueous medium produced in the recovery stage contains 30 to 40% sulfuric acid.

7. A process as defined in claim 1 in which the aqueous salt solution after at least partial removal of sulfate ions by fixation on the electrodes is treated with an agent for precipitating a salt therefrom and the precipitated salt is separated by filtration.

8. A process as defined in claim 7 in which the aqueous salt solution contains zinc sulfate, sodium sulfate, and sulfuric acid and after fixation of sulfate on the electrodes, the zinc is precipitated by sodium sulfide and the precipitated zinc sulfide is separated by filtration.

9. A process as defined in claim 7 in which the aqueous salt solution contains zinc sulfate, sodium sulfate, and sulfuric acid and after fixation of sulfate on the electrodes, the zinc is precipitated by rendering the salt solution alkaline and the zinc hydroxide is removed from the supernatant liquid.

JOHN W. CONWELL.

REFERENCES CITED

The following references are of record in the file of this patent:

UNITED STATES PATENTS

| Number | Name | Date |
|---|---|---|
| 915,980 | Luckow | Mar. 23, 1909 |
| 990,661 | Luckow | Apr. 25, 1911 |
| 1,032,623 | Reed | July 16, 1912 |
| 1,278,308 | Cullen | Sept. 10, 1918 |

OTHER REFERENCES

Blalock: Principles of Electrical Engineering, 2nd, ed., (1936), p. 138.